(12) United States Patent
Edelmann et al.

(10) Patent No.: US 8,043,701 B2
(45) Date of Patent: Oct. 25, 2011

(54) POLYMERIZABLE ORGANOSILICON NANOCAPSULES

(75) Inventors: Roland Edelmann, Wehr (DE); Jaroslaw Monkiewicz, Rheinfelden (DE)

(73) Assignee: Evonik Degussa GmbH, Essen (DE)

( * ) Notice: Subject to any disclaimer, the term of this patent is extended or adjusted under 35 U.S.C. 154(b) by 1651 days.

(21) Appl. No.: 11/258,025

(22) Filed: Oct. 26, 2005

(65) Prior Publication Data

US 2006/0063002 A1    Mar. 23, 2006

Related U.S. Application Data

(62) Division of application No. 09/970,991, filed on Oct. 5, 2001, now abandoned.

(30) Foreign Application Priority Data

Oct. 5, 2000 (DE) .................................. 100 49 632
Jan. 9, 2001 (DE) .................................. 101 00 633

(51) Int. Cl.
*B32B 5/00* (2006.01)
*B01J 13/02* (2006.01)
(52) U.S. Cl. ................... 428/402.2; 427/213.3; 523/200
(58) Field of Classification Search ..... 428/402–402.24; 427/213.3–213.36; 264/4–4.7
See application file for complete search history.

(56) References Cited

U.S. PATENT DOCUMENTS

| | | | |
|---|---|---|---|
| 4,617,327 A * | 10/1986 | Podszun | 523/116 |
| 4,624,971 A | 11/1986 | Van Tao et al. | |
| 5,569,717 A * | 10/1996 | Lambla et al. | 525/193 |
| 5,591,818 A | 1/1997 | Standke et al. | |
| 5,629,400 A | 5/1997 | Standke et al. | |
| 5,679,147 A | 10/1997 | Standke et al. | |
| 5,808,125 A | 9/1998 | Standke et al. | |
| 5,849,942 A | 12/1998 | Standke et al. | |
| 5,863,509 A | 1/1999 | Standke et al. | |
| 5,885,341 A | 3/1999 | Standke et al. | |
| 5,932,757 A | 8/1999 | Standke et al. | |
| 6,054,601 A | 4/2000 | Standke et al. | |
| 6,100,418 A | 8/2000 | Standke et al. | |
| 6,133,466 A | 10/2000 | Edelmann et al. | |
| 6,166,855 A | 12/2000 | Ikeyama et al. | |
| 6,176,918 B1 | 1/2001 | Glausch et al. | |
| 6,177,582 B1 | 1/2001 | Jenkner et al. | |
| 6,177,584 B1 | 1/2001 | Loewenberg et al. | |
| 6,228,936 B1 | 5/2001 | Standke et al. | |
| 6,239,194 B1 | 5/2001 | Standke et al. | |
| 6,251,989 B1 | 6/2001 | Edelmann et al. | |
| 6,255,513 B1 | 7/2001 | Standke et al. | |
| 6,288,256 B1 | 9/2001 | Standke et al. | |
| 6,361,871 B1 | 3/2002 | Jenkner et al. | |
| 6,395,858 B1 | 5/2002 | Mack et al. | |
| 6,403,228 B1 | 6/2002 | Mack et al. | |
| 6,462,115 B1 | 10/2002 | Takahashi et al. | |
| 6,491,838 B1 | 12/2002 | Standke et al. | |
| 6,500,883 B1 | 12/2002 | Mack et al. | |
| 6,528,585 B1 | 3/2003 | Standke et al. | |
| 6,534,667 B1 | 3/2003 | Standke et al. | |
| 6,641,870 B2 | 11/2003 | Bartkowiak et al. | |
| 6,663,952 B1 | 12/2003 | Mehnert et al. | |
| 6,689,468 B2 | 2/2004 | Edelmann et al. | |
| 6,695,904 B2 | 2/2004 | Burger et al. | |
| 6,699,586 B2 | 3/2004 | Edelmann et al. | |
| 6,713,186 B1 | 3/2004 | Jenkner et al. | |
| 6,720,072 B1 | 4/2004 | Hinterwaldner et al. | |
| 6,727,375 B2 | 4/2004 | Steding et al. | |
| 6,770,327 B2 | 8/2004 | Edelmann et al. | |
| 6,830,816 B2 | 12/2004 | Mehnert et al. | |
| 6,849,591 B1 * | 2/2005 | Boeckh et al. | 510/475 |
| 6,946,537 B2 | 9/2005 | Krafczyk et al. | |
| 2002/0098243 A1 | 7/2002 | Edelmann et al. | |
| 2002/0127415 A1 | 9/2002 | Standke et al. | |
| 2003/0018155 A1 | 1/2003 | Krafczyk et al. | |
| 2003/0095664 A1 | 5/2003 | Asano et al. | |
| 2003/0186066 A1 | 10/2003 | Monkiewicz et al. | |

FOREIGN PATENT DOCUMENTS

| | | |
|---|---|---|
| DE | 196 13 645 A1 | 10/1997 |
| DE | 197 19 948 A1 | 11/1998 |
| DE | 198 46 659 | 4/2000 |
| DE | 198 46 660 | 4/2000 |
| DE | 199 55 047 | 6/2001 |
| DE | 199 61 972 | 6/2001 |
| EP | 0 075 697 | 4/1983 |
| EP | 0 518 057 | 12/1992 |
| EP | 0 590 270 | 4/1994 |

(Continued)

OTHER PUBLICATIONS

U.S. Appl. No. 08/124,955, filed Sep. 21, 1993, Standke, et al.

(Continued)

*Primary Examiner* — James J Seidleck
*Assistant Examiner* — Saira Haider
(74) *Attorney, Agent, or Firm* — Oblon, Spivak, McClelland, Maier & Neustadt, L.L.P.

(57) ABSTRACT

The present invention provides a polymerizable organosilicon nanocapsule, which includes:
a nanoscale core A, which includes:
  at least one particle comprising at least one oxide or mixed oxide, KA-O, of at least one metal or semi-metal selected from the group including main groups 2 to 6 of the Periodic Table, transition groups 1 to 8 of the Periodic Table, lanthanides, and mixtures thereof;
and
an organosilicon shell B, which includes:
  at least one organosilicon compound having the formula (Ia):

$$(Si'O\!-\!)_x Si\!-\!R \qquad (Ia)$$

wherein R is a vinyl or allyl group;
  wherein x is a number from 0 to 20;
  wherein remaining free valences of Si are each independently (KA-O)—, SiO— or —Z;
  wherein remaining free valences of Si' are each independently (KA-O)—, SiO—, —R, or —Z;
  wherein the Z's are each independently hydroxyl or alkoxy radicals; and
  wherein each Si and Si' in the shell B have not more than one R group attached thereto.

7 Claims, No Drawings

FOREIGN PATENT DOCUMENTS

| | | |
|---|---|---|
| EP | 0 716 127 | 6/1996 |
| EP | 0 716 128 | 6/1996 |
| EP | 0 760 372 | 3/1997 |
| EP | 0 814 110 | 12/1997 |
| EP | 0 832 911 | 4/1998 |
| EP | 0 846 715 | 6/1998 |
| EP | 0 846 716 | 6/1998 |
| EP | 0 846 717 | 6/1998 |
| EP | 0 926 170 A1 | 6/1999 |
| EP | 0 930 342 | 7/1999 |
| EP | 0 953 591 | 11/1999 |
| EP | 0 955 344 | 11/1999 |
| EP | 0 960 921 | 12/1999 |
| EP | 0 978 525 | 2/2000 |
| EP | 0 997 469 | 5/2000 |
| EP | 1 031 593 | 8/2000 |
| WO | 98/51747 | 11/1998 |
| WO | WO/01/04257 * | 1/2001 |

OTHER PUBLICATIONS

U.S. Appl. No. 11/572,555, filed Jan. 23, 2007, Just, et al.
U.S. Appl. No. 11/572,688, filed Jan. 25, 2007, Edelmann, et al.
U.S. Appl. No. 11/572,691, filed Jan. 25, 2007, Edelmann, et al.
U.S. Appl. No. 10/563,022, filed Dec. 30, 2005, Edelmann, et al.
U.S. Appl. No. 10/112,045, filed Apr. 1, 2002, Mehnert, et al.
U.S. Appl. No. 11/576,504, filed Apr. 2, 2007, Mueh, et al.
U.S. Appl. No. 10/576,467, filed Apr. 20, 2006, Edelmann, et al.
U.S. Appl. No. 12/992,684, filed Mar. 4, 2011, Nowak, et al.
U.S. Appl. No. 13/058,290, filed Feb. 9, 2011, Weissenbach, et al.
U.S. Appl. No. 13/059,546, filed Feb. 17, 2011, Weissenbach, et al.
U.S. Appl. No. 13/062,225, filed Mar. 4, 2011, Weissenbach, et al.
U.S. Appl. No. 13/061,451, filed Feb. 28, 2011, Weissenbach, et al.

* cited by examiner

POLYMERIZABLE ORGANOSILICON NANOCAPSULES

BACKGROUND OF THE INVENTION

1. Field of the Invention

The present invention relates to polymerizable organosilicon nanocapsules having a core and an organosilicon shell, processes for preparing, and uses of same. Such compounds are particularly suited for use in scratch-resistant coatings.

2. Discussion of the Background

It is known that the surface properties of sol or gel particles or of metal or semimetal oxides can be modified by treatment with a hydrolyzable organosilane or organosiloxane, which generally involves the attachment of just a single-ply silane layer to the oxide or sol gel particle. Oxides or sol or gel particles treated in this way, examples being inorganic pigments or fillers, may be incorporated into a polymer matrix, films, coating compositions and coatings producible therewith. In general, however, the scratch resistance of such polymer systems is low.

DE 198 46 660 discloses nanoscale, surface-modified oxide or mixed-oxide particles enveloped by organosilicon groups bonded covalently to the oxide particle, the organofunctional groups being described as reactive groups and normally being oriented outward, so that by means of polymerization they are bound into the polymer matrix with the polymer material when the prepolymer is cured. The process of preparing such coating compositions is complicated, since the organosilane and the oxide component are incorporated separately into the prepolymer.

DE 198 46 659 possesses the same priority as DE 198 46 660 and relates to a laminate provided with a scratch-resistant synthetic-resin layer which likewise contains nanoscale, surface-modified oxide particles. DE 198 46 659 teaches specifically the use of acryloyloxyalkylsilanes to produce a shell around nanoscale oxide particles that possess reactive, radiation-crosslinkable groups. The preparation of the coating composition in this case is likewise via a time-consuming reaction of a nanoscale silica with 3-methacryloyloxypropyltrimethoxysilane (DYNASYLAN® MEMO) in an acrylate formulation in the presence of water, an acid, and a wetting agent. Again, the components must be brought together separately and in a specific sequence.

Hydrolyzable silane components having ethylenically unsaturated organic groups are usually high-priced starting materials, however. In addition, DYNASYLAN® MEMO tends to react in the presence of even slight traces of a polymerization initiator or radiation with the undesirable result that the viscosity of a corresponding formulation may rise drastically. To avoid the unwanted polymerization, stabilizers must be added. It is therefore often difficult to master the handling of the starting materials and the preparation of such coating systems.

The coating compositions described above are frequently of high viscosity, and usually contain only a small fraction of oxide particles, which impacts the scratch resistance of the subsequent coating. It is difficult to apply such highly viscous coating compositions to a substrate, especially when the substrate in question is thin and can be destroyed by tearing. The scratch resistance of coatings obtainable in this way is in need of improvement, and with such highly viscous systems, a specific, complex application apparatus is required. In many cases, solvents are added to coating compositions of such high viscosity, but this undesirably leads to an increase in the organic emissions (VOC problem; VOC=volatile organic compounds).

SUMMARY OF THE INVENTION

It is an object of the present invention to provide polymerizable organosilicon-modified nanoparticles and a process for their production.

Another object is to provide a process for preparing coating compositions for scratch-resistant coatings in as simple and economic a manner as possible.

Another object of the invention is to provide articles with a corresponding scratch-resistant synthetic-resin coating.

These and other objects have now been achieved by the present invention, the first embodiment of which provides a polymerizable organosilicon nanocapsule, which includes:
a nanoscale core A, which includes:
at least one particle including at least one oxide or mixed oxide, KA-O, of at least one metal or semimetal selected from the group including main groups 2 to 6 of the Periodic Table, transition groups 1 to 8 of the Periodic Table, lanthanides, and mixtures thereof;
and
an organosilicon shell B, which includes:
at least one organosilicon compound having the formula (Ia):

$$(Si'O—)_xSi—R \qquad (Ia)$$

wherein R is a vinyl or allyl group;
wherein x is a number from 0 to 20;
wherein remaining free valences of Si are each independently (KA-O)—, SiO— or —Z;
wherein remaining free valences of Si' are each independently (KA-O)—, SiO—, —R, or —Z;
wherein the Z's are each independently hydroxyl or alkoxy radicals; and
wherein each Si and Si' in the shell B have not more than one R group attached thereto.

Another embodiment of the present invention provides a composition, which includes the above nanocapsule and at least one selected from the group including a liquid, curable synthetic resin, a precursor of a synthetic resin, and a mixture thereof.

Another embodiment of the present invention provides a process, which includes applying the above composition to a substrate.

Another embodiment of the present invention provides a composition, which includes the above nanocapsule and a cured resin, wherein said cured resin includes at least one selected from the group including acrylate, methacrylate, epoxide, epoxy resin, polyurethane, polyurethane resin, unsaturated polyester, unsaturated polyester resin, epoxy acrylate, polyester acrylate, urethane acrylate, silicone acrylate, and mixtures thereof.

Another embodiment of the present invention provides a coated article, which includes the above composition in contact with a substrate.

Another embodiment of the present invention provides a polymerizable organosilicon nanocapsule prepared by a process, which includes reacting:
(i) at least one nanoscale oxide and/or mixed oxide (KA-O) particle of at least one metal or semimetal selected from the group including main groups two to six of the Periodic Table of the Elements, transition groups one to eight of the Periodic Table of the Elements, lanthanides, and combinations thereof,
with
(ii) at least one vinyltrialkoxysilane and/or allyltrialkoxysilane, alkoxy being a methoxy, ethoxy, n-propoxy or i-propoxy group, and
(iii) optionally, at least one monomeric and/or oligomeric silicic ester which carries at least one selected from the group including methoxy, ethoxy, n-propoxy, i-propoxy group, and combinations thereof and has an average degree of oligomerization of from 1 to 50,
and
(iv) optionally, at least one organofunctional siloxane whose functionalities are identical or different and in which each silicon atom independently carries at least one functionality selected from the group including alkyl, fluoroalkyl, cyanoalkyl, isocyanoalkyl, alkenyl, aminoalkyl, diaminoalkyl, triaminoalkyl, alkoxyalkyl, hydroxyalkyl, acylalkyl, glycidyloxyalkyl, acryloyloxyalkyl, methacryloyloxyalkyl, mercaptoalkyl, ureidoalkyl, aryl, alkoxy, and combinations thereof, and remaining free valences of the silicon atoms in the siloxane are satisfied by methoxy or ethoxy or hydroxyl groups,
and
(v) optionally, a further organofunctional silane having the formula II:

$$R'_s R''_r SiY_{(4-s-r)} \quad (II),$$

in which the groups R' and R" are identical or different and are each independently selected from the group including a linear, branched or cyclic alkyl group having 1 to 20 carbon atoms, chloroalkyl, bromoalkyl, iodoalkyl, isocyanoalkyl, cyanoalkyl, fluoroalkyl, perfluoroalkyl, alkenyl, aryl, acylalkyl, acryloyloxyalkyl, methacryloyloxyalkyl, sulfane, mercaptoalkyl, thiacyamidoalkyl, glycidyloxyalkyl, aminoalkyl, diaminoalkyl, triaminoalkyl, carbonatoalkyl or ureidoalkyl group, the respective alkylene groups containing 1 to 6 carbon atoms, Y is a methoxy, ethoxy, i-propoxy, n-propoxy or 2-methoxyethoxy group, s is 1 or 2 or 3, and r is 0 or 1 or 2, subject to the proviso that (s+r)≦3, wherein the reacting is carried out in situ in a liquid, a curable synthetic resin or a precursor of a synthetic resin.

Another embodiment of the present invention provides a process for preparing a polymerizable organosilicon nanocapsule, which includes reacting:
(i) at least one nanoscale oxide and/or mixed oxide (KA-O) particle of at least one metal or semimetal selected from the group including main groups two to six of the Periodic Table of the Elements, transition groups one to eight of the Periodic Table of the Elements, lanthanides, and combinations thereof,
with
(ii) at least one vinyltrialkoxysilane and/or allyltrialkoxysilane, alkoxy being a methoxy, ethoxy, n-propoxy or i-propoxy group,
and
(iii) optionally, at least one monomeric and/or oligomeric silicic ester which carries at least one selected from the group including methoxy, ethoxy, n-propoxy, i-propoxy group, and combinations thereof and has an average degree of oligomerization of from 1 to 50,
and
(iv) optionally, at least one organofunctional siloxane whose functionalities are identical or different and in which each silicon atom independently carries at least one functionality selected from the group including alkyl, fluoroalkyl, cyanoalkyl, isocyanoalkyl, alkenyl, aminoalkyl, diaminoalkyl, triaminoalkyl, alkoxyalkyl, hydroxyalkyl, acylalkyl, glycidyloxyalkyl, acryloyloxyalkyl, methacryloyloxyalkyl, mercaptoalkyl, ureidoalkyl, aryl, alkoxy, and combinations thereof, and remaining free valences of the silicon atoms in the siloxane are satisfied by methoxy or ethoxy or hydroxyl groups,
and
(v) optionally, a further organofunctional silane having the formula II:

$$R'_s R''_r SiY_{(4-s-r)} \quad (II),$$

in which the groups R' and R" are identical or different and are each independently selected from the group including a linear, branched or cyclic alkyl group having 1 to 20 carbon atoms, chloroalkyl, bromoalkyl, iodoalkyl, isocyanoalkyl, cyanoalkyl, fluoroalkyl, perfluoroalkyl, alkenyl, aryl, acylalkyl, acryloyloxyalkyl, methacryloyloxyalkyl, sulfane, mercaptoalkyl, thiacyamidoalkyl, glycidyloxyalkyl, aminoalkyl, diaminoalkyl, triaminoalkyl, carbonatoalkyl or ureidoalkyl group, the respective alkylene groups containing 1 to 6 carbon atoms, Y is a methoxy, ethoxy, i-propoxy, n-propoxy or 2-methoxyethoxy group, s is 1 or 2 or 3, and r is 0 or 1 or 2, subject to the proviso that (s+r)≦3, wherein the reacting is carried out in situ in a liquid, a curable synthetic resin or a precursor of a synthetic resin.

Another embodiment of the present invention provides a process for preparing a composition based on a curable synthetic resin and including polymerizable organosilicon nanocapsules, the process including:
heating the curable synthetic resin or a precursor of the curable synthetic resin,
adding catalyst, optionally, a wetting agent and water,
adding at least one organosilicon component of the formula III:

$$R^1 R^2_n SiX_{3-n} \quad (III),$$

where the groups $R^1$ and $R^2$ are identical or different, $R^1$ is an alkenyl group having 2 to 18 carbon atoms, an aryl, alkylaryl, an arylalkyl, an acylalkyl, an aminoalkyl, a diaminoalkyl, a triaminoalkyl, an alkyloxyalkyl, an acylalkyl, a cyanoalkyl, an isocyanoalkyl, a glycidyloxyalkyl, an acyloxyalky, an acryloyloxyalkyl, a mercaptoalkyl, a polysulfide-alkyl or a methacryloyloxyalkyl group, and $R^2$ possesses the same definition as $R^1$ or is a linear, branched or cyclic alkyl group having 1 to 20 carbon atoms, which is unsubstituted or substituted,
and
optionally, a monomeric and/or oligomeric silicic ester which carries at least one selected from the group including methoxy, ethoxy, n-propoxy, i-propoxy group and combinations thereof and has an average degree of oligomerization of from 1 to 50,
and
optionally, an organofunctional siloxane whose functionalities are identical or different and in which each silicon atom in the siloxane carries at least one functionality selected from the group including alkyl, fluoroalkyl, cyanoalkyl, isocyanoalkyl, alkenyl, aminoalkyl, diaminoalkyl, triaminoalkyl, alkoxyalkyl, hydroxyalkyl, acylalkyl, glycidyloxyalkyl, acryloyloxyalkyl, methacryloyloxyalkyl, mercaptoalkyl, ureidoalkyl, aryl, alkoxy, methoxy, ethoxy, and combinations thereof, and remaining free valences of the silicon atoms in the siloxane are satisfied by methoxy or ethoxy or hydroxyl groups,
mixing and then adding at least one nanoscale oxide and/or mixed oxide (KA-O) particle of at least one metal or semimetal selected from the group including main groups 2 to 6, of the Periodic Table of the Elements, transition groups 1 to 8 of the Periodic Table of the Elements, lanthanides, and mixtures thereof with thorough mixing, and removing alcohol formed by hydrolysis and/or condensation.

DESCRIPTION OF THE PREFERRED EMBODIMENTS

Various other objects, features and attendant advantages of the present invention will be more fully appreciated as the same becomes better understood from the following detailed description of the preferred embodiments of the invention.

It has surprisingly now been found that polymerizable organosilicon nanocapsules may be obtained in a simple and economic way by reacting:

(i) at least one nanoscale oxide and/or mixed oxide (KA-O) of at least one metal or semimetal of main groups two to six or transition groups one to eight of the Periodic Table of the Elements, or of the lanthanides, with (ii) vinyltrialkoxysilane and/or allyltrialkoxysilane, alkoxy preferably being a methoxy, ethoxy, n-propoxy or i-propoxy group, and (iii) if desired, a monomeric and/or oligomeric silicic ester which carries methoxy, ethoxy, or i- and/or n-propoxy groups and has an average degree of oligomerization of from 1 to 50, preferably from 2 to 10, with particular preference from 3 to 5, and (iv) if desired, an organofunctional siloxane whose functionalities are identical or different and in which each silicon atom in the siloxane carries a functionality selected from the group including alkyl, which is linear, branched or cyclic with 1 to 20 carbon atoms, preferably 1 to 16 carbon atoms, fluoroalkyl, cyanoalkyl, isocyanoalkyl, alkenyl, aminoalkyl, diaminoalkyl, triaminoalkyl, alkoxy alkyl, hydroxyalkyl, acylalkyl, glycidyloxyalkyl, acryloyloxyalkyl, methacryloyloxyalkyl, mercaptoalkyl, ureidoalkyl, aryl and alkoxy, preferably methoxy, ethoxy, n-propoxy or i-propoxy, and the remaining free valences of the silicon atoms in the siloxane are satisfied by methoxy or ethoxy or hydroxyl groups, and (v) if desired, a further organofunctional silane of the general formula II

$$R'_sR''_rSiY_{(4-s-r)} \quad (II),$$

in which the groups R' and R" are identical or different and are each a linear, branched or cyclic alkyl group having 1 to 20 carbon atoms, preferably 1 to 16 carbon atoms, a chloroalkyl, bromoalkyl, iodoalkyl, isocyanoalkyl, cyanoalkyl, fluoroalkyl or perfluoroalkyl, alkenyl, aryl, acylalkyl, acryloyloxyalkyl, methacryl-oyloxyalkyl, sulfane, mercaptoalkyl, thiacyamidoalkyl, glycidyloxyalkyl, aminoalkyl, diaminoalkyl, triaminoalkyl, carbonatoalkyl or ureidoalkyl group, the respective alkylene groups containing 1 to 6 carbon atoms, R" is preferably a methyl, Y is a methoxy, ethoxy, i-propoxy, n-propoxy or 2-methoxyethoxy group, and s is 1 or 2 or 3 and r is 0 or 1 or 2, subject to the proviso that (s+r)≦3, in situ in a curable synthetic resin or a precursor of a curable synthetic resin, i.e., a liquid prepolymer or a mixture of corresponding prepolymers, for example, an acrylate, methacrylate, epoxide, polyurethane and/or unsaturated polyester. In accordance with this procedure, the polymerizable organosilicon nanocapsules are obtained, advantageously, simultaneously incorporated homogeneously into the prepolymer.

Further, it has surprisingly been found that the following reaction for the preparation in situ of a polymerizable coating composition that contains organosilicon nanocapsules may be conducted in a particularly advantageous way if an organosilane containing a reactive, polymerizable organofunctional group, such as a vinyl group or allyl group or a group as may be inferred from DE 198 46 660 and DE 198 46 659 (the entire contents of each of which being hereby incorporated by reference), and at least one hydrolyzable group, preferably, methoxy, ethoxy, i- or n-propoxy or 2-methoxyethoxy, or at least one hydroxyl group, together if desired with abovementioned components (iii) to (v), is first introduced into a liquid, curable synthetic resin or a precursor of a synthetic resin, together with a catalyst, wetting agents if desired, and water the system is mixed and only then is the component (i) added, with thorough mixing, and hydrolysis alcohol formed is stripped from the system, i.e., in such a way that in the present process, in contrast to the teaching of DE 198 46 659 and DE 198 46 660, the organosilicon components and the oxide component are not incorporated alternately or separately into the prepolymer.

The present process is surprising and advantageous in that it is thereby possible, simply and economically, to obtain a coating composition for scratch-resistant coatings which includes polymerizable organosilicon nanocapsules, possesses a comparatively low viscosity, and is homogeneous, it being possible for the coating composition to contain a particularly high proportion of polymerizable organosilicon nanoparticles.

In general, in this process, hydrolyzable groups of the organosilicon components hydrolyze and/or condense with one another and envelop the oxide nanoparticles (KA-O). If appropriate, the hydrolyzable groups or hydroxyl groups may condense with hydroxyl groups present on the surface of the oxide nanoparticles (KA-O), or with free valences of organosilicon components of the shell B, to form a covalent linkage. It should be highlighted that, in particular, vinyl trimethoxysilane (DYNASYLAN® VTMO) exhibits a hydrolysis behavior, i.e., preparation behavior, which is again significantly improved over that of vinyl triethoxysilane (DYNASYLAN® VTEO).

In the case of the present process, the reaction takes place suitably in the presence of defined amounts of water. It is preferred to use from 0.5 to 6 mol of water, with particular preference from 0.5 to 4 mol of water, with very particular preference from 1 to 1.5 mol of water, per mole of a hydrolyzable, Si-bonded group of the organosilicon components. These ranges include 0.75, 1.1, 1.8, 2, 2.5, 3, 4.5 and 5 mol of water. The use of a catalyst and of a wetting agent is preferred.

In particular it is possible in the case of the present process, through the use of vinyl trimethoxysilane or vinyltriethoxysilane, to obtain coating compositions having high solids contents, high transparency, and good processing properties.

In general in the case of dilatant coating systems of this kind, the target viscosity is up to 2500 mPa s. Preferably, solvent-free coating compositions of the invention possess a viscosity of >500 to 2000 mPa s, with particular preference from 800 to 1000 mPa s. These ranges include 600, 700, 900, 1100, 1500, 1800, 2000, and 2300 mPa s. In this case the amounts of polymerizable nanoscale capsules in coating compositions of the invention are suitably between 5 and 60% by weight, which range includes 10, 20, 30, 40 and 50% by weight.

Preferably, in the case of the present process, the product substantially includes nanoscale oxide or mixed-oxide particles, with a complete and multilayer organosilicon shell, referred to as polymerizable organosilicon nanocapsules, which are obtained directly, advantageously, in fine dispersion in a curable synthetic resin or a precursor of a curable synthetic resin, and the comparatively low-viscosity product mixture may be used as it is or as a basis for coating materials for the scratch-resistant coating of surfaces.

The organosilicon shell in the nanocapsule of the present invention may be covalently bonded to the core, or it may be in contact with the core but not covalently bonded to the core. Preferably, at least one covalent bond is present between the shell and the core. The nanocapsules may be present in compositions as either a bonded type or a non-bonded type or may be present as a mixture of bonded and non-bonded types.

The organosilicon shell may completely or partially cover the core, independently of the bonding or non-bonding nature of the nanocapsule. Preferably, the organosilicon shell completely or substantially completely covers the core. The nanocapsule may be present in compositions as only the completely covered or as only the partially covered or mixtures of completely covered and partially covered. Preferably, the nanocapsules are present as mixtures of both completely and partially covered types.

Coating materials or coating compositions of the invention may optionally contain as further components initiators for the photochemical curing and/or UV curing, such as Darocur® 1173, Lucirin® TPO-L, stabilizers, such as HALS compounds, Tinuvins, and also antioxidants, such as Irganox®.

By means of the present preparation method, a solvent-free, comparatively low-viscosity coating material or a composition containing polymerizable organosilicon nanocapsules of the invention is accessible simply, directly, and economically.

The coating of a substrate with the present composition is generally comparatively easy owing to the low viscosity of the composition.

Preferably, the present, comparatively low-viscosity composition, or the coating material, may be provided with an unexpectedly high proportion of organosilicon nanocapsules, it being possible to incorporate up to 60% by weight oxide or mixed-oxide content, based on the coating composition, into the system. This range includes 10, 20, 30, 40 and 50% by weight.

The coating is preferably cured photochemically by UV irradiation or by irradiation with electron beams. The irradiation is normally conducted at a temperature of from 10 to 60° C., advantageously at ambient temperature. This range includes 15, 20, 25, 30, 40 and 50° C.

Articles or substrates coated in accordance with the invention are generally notable for outstanding scratch resistance in accordance with DIN 53 799 (hard metal balls) and for good abrasion resistance (DIN 52 347), the entire contents of each of which being incorporated by reference.

Accordingly it is possible, especially with coating compositions of the invention that include vinyl- or allyl-functional organosilicon nanocapsules, to achieve excellent scratch resistance.

Preferably, the present invention accordingly provides a process for preparing a composition based on a curable synthetic resin or precursor of a curable synthetic resin and containing polymerizable organosilicon nanocapsules by introducing and heating the curable synthetic resin or its precursor, adding catalyst, wetting agent if desired, and defined amounts of water, adding at least one organosilicon component of the general formula III $$R^1R^2_nSiX_{3-n} \quad (III),$$

where the groups $R^1$ and $R^2$ are identical or different, $R^1$ is an alkenyl group having 2 to 18 carbon atoms, an aryl, alkylaryl, an arylalkyl, an acylalkyl, an aminoalkyl, a diaminoalkyl, a triaminoalkyl, an alkyloxyalkyl, an acylalkyl, a cyanoalkyl, an isocyanoalkyl, a glycidyloxyalkyl, an acyloxyalky, an acryloyloxyalkyl, a mercaptoalkyl, a polysulfide-alkyl or a methacryloyloxyalkyl group, and $R^2$ possesses the same definition as listed for $R^1$ or is a linear, branched or cyclic alkyl group having 1 to 20 carbon atoms, preferably 1 to 16 carbon atoms, which is unsubstituted or substituted, and if desired, a monomeric and/or oligomeric silicic ester which carries methoky, ethoxy, n-propoxy or i-propoxy groups and has an average degree of oligomerization of from 1 to 50, and if desired, an organofunctional siloxane whose functionalities are identical or different and in which each silicon atom in the siloxane carries a functionality from the group including alkyl, which is linear, branched or cyclic with 1 to 16 carbon atoms, fluoroalkyl, cyanoalkyl, isocyanoalkyl, alkenyl, aminoalkyl, diaminoalkyl, triaminoalkyl, alkoxyalkyl, hydroxyalkyl, acylalkyl, glycidyloxyalkyl, acryloyloxyalkyl, methacryloyloxyalkyl, mercaptoalkyl, ureidoalkyl, aryl and alkoxy, preferably methoxy or ethoxy, and the remaining free valences of the silicon atoms in the siloxane are satisfied by methoxy or ethoxy or hydroxyl groups, mixing the system and then adding at least one nanoscale oxide and/or mixed oxide (KA-O) of at least one metal or semimetal from main groups 2 to 6 or transition groups 1 to 8 of the Periodic Table of the Elements, or of the lanthanides, with thorough mixing, in the course of which process the alcohol formed by hydrolysis and/or condensation is removed from the system.

Another preferred embodiment of the present invention provides polymerizable organosilicon nanocapsules including a nanoscale core A, which includes at least one oxide and/or mixed oxide (KA-O) of at least one metal or semimetal from main groups 2 to 6 or transition groups 1 to 8 of the Periodic Table of the Elements, or of the lanthanides, and an organosilicon shell B, wherein the organosilicon shell B includes at least one organosilicon constituent of the general formula Ia $$(Si'O-)_xSi-R \quad (Ia),$$

in which R is a vinyl or allyl group and x is a number from 0 to 20, the remaining free valences of Si being satisfied by SiO—, and/or —Z and the free valences of Si' being satisfied by SiO—, —R and/or —Z, the groups Z being identical or different and being hydroxyl and/or alkoxy radicals, and each Si and Si' of the shell B carrying not more than one group R, and/or wherein the organosilicon shell B is bonded to the core A (KA-O) via one or more covalent linkages to give the general formula Ib $$(KA-O)-\{(Si'O-)_xSi-R\} \quad (Ib)$$

in which R is a vinyl or allyl group and x is a number from 0 to 20, preferably from 1 to 15, with particular preference from 2 to 10, the remaining free valences of Si being satisfied by (KA-O)—, SiO—, and/or —Z and the free valences of Si' being satisfied by (KA-O)—, SiO—, —R and/or —Z, the groups Z being identical or different and being hydroxyl and/or alkoxy radicals, and each Si and Si' of the shell B carrying not more than one group R.

In the compounds having the formula (Ia) and/or (Ib), the range of 0 to 20 for x includes 1, 2, 3, 4, 5, 6, 7, 8, 9, 10, 11, 12, 13, 14, 15, 16, 17, 18, and 19.

Preferably, in the compounds of formulas (Ia) and/or (Ib), the Si and Si' are tetravalent silicons.

Preferred alkoxy radicals of the groups Z are those with a linear, cyclic or branched alkyl radical having 1 to 18 carbon atoms, and particular preference is given to methoxy, ethoxy, i- or n-propoxy groups.

Referring to the Periodic Table, of which the version disclosed in *The Merck Index*, $11^{th}$ ed., Merck & Co. 1989 is hereby incorporated in its entirety by reference, the term, "main groups 2 to 6" refers to groups IIa, IIIa, IVa, Va and VIa, respectively; and the term, "transition groups 1 to 8" refers to groups Ib, IIb, IIIb, IVb, Vb, VIb, VIIb and VIII, respectively; and lanthanides refer to any of elements 57-71.

Thus, in the case of organosilicon nanocapsules of the invention, the weight ratio between core A and shell B is preferably from 1:1 to 4:1. This range includes all values and subranges therebetween, including 1.5:1, 2:1, 2.5:1, 3:1, and 3.5:1.

The core A of the polymerizable organosilicon nanocapsules of the invention preferably includes at least one oxide and/or mixed oxide (KA-O), including oxide hydroxides, selected from the group the elements Si, Al, Ti and/or Zr, for example, $SiO_2$, such as pyrogenically prepared silica, silicates, $Al_2O_3$, aluminum hydroxide, alumosilicates, $TiO_2$, titanates, $ZrO_2$ or zirconates. Mixtures are possible.

Including the shell B, polymerizable organosilicon nanocapsules of the invention preferably have an average diameter of from 10 to 400 nm, with particular preference from 20 to 100 nm. These ranges include 30, 40, 50, 60, 70, 80, 90, 200 and 300 nm.

Another preferred embodiment of the present invention provides polymerizable organosilicon nanocapsules obtainable by reacting (i) at least one nanoscale oxide and/or mixed oxide (KA-O) of at least one metal or semimetal from main groups two to six or transition groups one to eight of the Periodic Table of the Elements, or of the lanthanides, with (ii) vinyltrialkoxysilane and/or allyltrialkoxysilane, alkoxy being a methoxy, ethoxy, n-propoxy or i-propoxy group, and (iii) if desired, a monomeric and/or oligomeric silicic ester which carries methoxy, ethoxy, or n- and/or i-propoxy groups and has an average degree of oligomerization of from 1 to 50, for example, tetramethoxysilane, tetraethoxysilane, such as DYNASIL®A, tetrapropoxysilane, such as DYNASIL®P, or an oligomeric ethyl silicate, such as DYNASIL®40, and (iv) if desired, an organofunctional siloxane whose functionalities are identical or different and in which each silicon atom in the siloxane carries a functionality selected from the group including alkyl, which is linear, branched or cyclic with 1 to 20 carbon atoms, fluoroalkyl, cyanoalkyl, iso-cyanoalkyl, alkenyl, aminoalkyl, diaminoalkyl, triaminoalkyl, alkoxyalkyl, hydroxyalkyl, acylalkyl, glycidyloxyalkyl, acryloyloxyalkyl, methacryloyloxyalkyl, mercaptoalkyl, ureidoalkyl, aryl and alkoxy, preferably methoxy or ethoxy, and the remaining free valences of the silicon atoms in the siloxane are satisfied by methoxy or ethoxy or hydroxyl groups, preference being given to those siloxanes having an average degree of oligomerization of from 1 to 20, preferably having an average degree of oligomerization of from 2 to 10, as may be preferably found in the German patent applications 199 55 047.6, 199 61 972.7, EP 0 518 057, EP 0 590.270, EP 0 716 127, EP 0 716 128, EP 0 760 372, EP 0 814 110, EP 0 832 911, EP 0 846 717, EP 0 846 716, EP 0 846 715, EP 0 953 591, EP 0 955 344, EP 0 960 921, EP 0 978 525, EP 0 930 342, EP 0 997 469, EP 1 031 593, and EP 0 075 697, (the entire contents of each of which being hereby incorporated by reference)

and (v) if desired, a further organofunctional silane of the general formula II

$$R'_s R''_r SiY_{(4-s-r)} \quad (II),$$

in which the groups R' and R" are identical or different and are each a linear, branched or cyclic alkyl group having 1 to 20 carbon atoms, a chloroalkyl, bromoalkyl, iodoalkyl, isocyanoalkyl, cyanoalkyl, fluoroalkyl or perfluoroalkyl, alkenyl, aryl, acylalkyl, acryloyloxyalkyl, methacryloyloxyalkyl, sulfane, mercaptoalkyl, thiacyamidoalkyl, glycidyloxyalkyl, aminoalkyl, diaminoalkyl, triaminoalkyl, carbonatoalkyl or ureidoalkyl group, the respective alkylene groups containing 1 to 6 carbon atoms, R" is preferably a methyl, Y is a methoxy, ethoxy, i-propoxy, n-propoxy or 2-methoxyethoxy group, and s is 1 or 2 or 3 and r is 0 or 1 or 2, subject to the proviso (s+r)≦3, in situ in a substantially liquid, curable synthetic resin or a precursor of a synthetic resin.

Furthermore, an object of the present invention is a process for the production of polymerizable silicon-organic nanocapsules as well as for the production of a composition containing polymerizable silicon-organic nanocapsules. The polymerizable silicon-organic nanocapsules are particularly suitable in the production, in situ, of a fluid, curable synthetic resin, or in a precursor stage of a synthetic resin. The synthetic resin composition which contains the polymerizable silicon-organic nanocapsules can be used as a coating agent or as a paint or paint base for the production of scratch-resistant coatings on a substrate. The present invention also contemplates a substrate coated with the synthetic resin.

Another preferred embodiment of the present invention provides a process for preparing polymerizable organosilicon nanocapsules, which includes reacting (i) at least one nanoscale oxide and/or mixed oxide (KA-O) and at least one metal or semimetal from main groups two to six or transition groups one to eight of the Periodic Table of the Elements, or of the lanthanides, with (ii) vinyltrialkoxysilane and/or allyltrialkoxysilane, alkoxy being a methoxy, ethoxy, n-propoxy or i-propoxy group, and (iii) if desired, a monomeric and/or oligomeric silicic ester which carries methoxy, ethoxy, or n- and/or i-propoxy groups and has an average degree of oligomerization of from 1 to 50, preferably from 2 to 10, with particular preference from 3 to 5, and (iv) if desired, an organofunctional siloxane whose functionalities are identical or different and in which each silicon atom in the siloxane carries a functionality selected from the group including alkyl, which is linear, branched or cyclic with 1 to 20 carbon atoms, fluoroalkyl, cyanoalkyl, isocyanoalkyl, alkenyl, aminoalkyl, diaminoalkyl, triaminoalkyl, alkoxyalkyl, hydroxyalkyl, acylalkyl, glycidyloxyalkyl, acryloyloxyalkyl, methacryloyloxyalkyl, mercaptoalkyl, ureidoalkyl, aryl and alkoxy, preferably methoxy or ethoxy, and the remaining free valences of the silicon atoms in the siloxane are satisfied by methoxy or ethoxy or hydroxyl groups, and (v) if desired, a further organofunctional silane of the general formula II

  (II), in which the groups R' and R" are identical or different and are each a linear, branched or cyclic alkyl group having 1 to 20 carbon atoms, a chloroalkyl, bromoalkyl, iodoalkyl, isocyanoalkyl, cyanoalkyl, fluoroalkyl or perfluoroalkyl, alkenyl, aryl, acryloyloxyalkyl, methacryloyloxyalkyl, sulfane, mercaptoalkyl, thiacyamidoalkyl, glycidyloxyalkyl, aminoalkyl, diaminoalkyl, triaminoalkyl, carbonatoalkyl or ureidoalkyl group, the respective alkylene groups containing 1 to 6 carbon atoms, R" is preferably a methyl, Y is a methoxy, ethoxy, i-propoxy, n-propoxy or 2-methoxyethoxy group, and s is 1 or 2 or 3 and r is 0 or 1 or 2, subject to the proviso $(s+r)\leq 3$, in situ in a substantially liquid, curable synthetic resin or a precursor of a synthetic resin.

The following compounds may be employed in particular, but not exclusively, as organofunctional silanes as per (v): methyltrimethoxysilane (DYNASYLAN® MTMS), methyl triethoxysilane (DYNASYLAN® MTES), propyltrimethoxysilane (DYNASYLAN® PTMO), propyltriethoxysilane (DYNASYLAN® PTEO), i-butyltrimethoxysilane (DYNASYLAN® IBTMO), i-butyltriethoxysilane (DYNASYLAN® IBTEO), octyltrimethoxysilane (DYNASYLAN® OCTMO), octyltriethoxysilane (DYNASYLAN® OCTEO), hexadecyltrimethoxysilane (DYNASYLAN® 9116), hexadecyltriethoxysilane (DYNASYLAN® 9216), 3-chloropropyltrialkoxysilanes, 3-bromopropylalkoxysilanes, 3-iodopropylalkoxysilanes, 3-chloropropyltrichlorosilanes, 3-chloropropylmethyldialkoxy-silanes, 3-chloropropylmethyldichlorosilanes, 3-chloropropyldimethylalkoxysilanes, 3-chloropropyldimethylchlorosilanes, 3-aminopropylmethyldialkoxysilanes, 3-aminopropyltrialkoxysilane, including 3-aminopropyltrimethoxysilane (DYNASYLAN® AMMO), 3-aminopropyltriethoxysilane (DYNASYLAN® AMEO), N-(n-butyl)-3-aminopropyltrimethoxysilane (DYNASYLAN® 1189), n-aminoethyl-3-aminopropylmethyldimethoxysilane (DYNASYLAN® 1411), 3-aminopropylmethyldiethoxysilane (DYNASYLAN® 1505), N-aminoethyl-3-aminopropylmethyldialkoxysilane, N-aminoethyl-3-aminopropyltrimethoxysilane (DYNASYLAN® DAMO), triamino-functional propyltrimethoxysilane (DYNASYLAN® TRIAMO), including {N-aminoethyl-N'-(3-tri-alkoxysilylpropyl)}ethylenediamines and also {N-aminoethyl-N-(3-trialkoxysilylpropyl)}ethylenediamines, triamino-functional propylmethyldialkoxysilanes, 3-(4,5-dihydroimidazolyl)propyltriethoxysilane (DYNASYLAN® IMEO), 3-methacryloyloxypropylalkoxysilanes, 3-methacryloyloxypropyltrimethoxysilane (DYNASYLAN® MEMO), 3-methacryloyloxyisobutyltrialkoxysilanes, 3-glycidyloxypropyltrialkoxysilanes, 3-glycidyloxypropyltrimethoxysilane (DYNASYLAN® GLYMO), 3-glycidyloxypropyltriethoxysilane (DYNASYLAN® GLYEO), 3-mercaptopropylalkoxysilanes, 3-mercaptopropyltrimethoxysilane (DYNASYLAN® MTMO), vinyltrialkoxysilanes, including vinyltrimethoxysilane (DYNASYLAN® VTMO), vinyltriethoxysilane (DYNASIL® VTEO), vinyltris (2-methoxyethoxy)silane (DYNASYLAN® VTMOEO), perfluoroalkyltrialkoxysilanes, fluoroalkyltrialkoxysilanes, including tridecafluorooctyltrimethoxysilane, tridecafluorooctyltriethoxysilane (DYNASYLAN® F 8261), tridecafluorooctylmethyldialkoxysilanes, trimethylchlorosilane, triethylchlorosilane, $(H_5CO)_3Si(CH_2)_3$—$S_4$—$(CH_2)_3Si(OC_2H_5)_3$ 1,4-bis (3-triethoxysilylpropyl) tetrasulfane (Si-69), $(H_5C_2O)_3Si(CH_2)_3$—NCS 3-thiacyamidopropyltriethoxysilane (Si-264), $(H_5C_2O)_3Si(CH_2)_3$—$S_2$—$(CH_2)_3Si(OC_2H_5)_3$ 1,2-bis(3-triethoxysilylpropyl)disulfane (Si-266), 3-cyanopropyltrialkoxysilanes, including 3-cyanopropyltrimethoxysilane, N,N',N"-tris(trimethoxysilylpropyl) triisocyanurate, 3-{methoxy(polyethyleneglycidyl)}propyltrialkoxysilanes, allyltrialkoxysilanes, allymethyldialkoxysilane, allyldimethylakoxysilane, 3-methacryloyloxy-2-methylpropyltrialkoxysilanes, 3-amino-2-methylpropyltrialkoxysilanes, (cyclohex-3-enyl)-ethyltrialkoxysilanes, N-(3-trialkoxysilylpropyl)alkyl carbamates, 3-azidopropyltrialkoxysilanes, 4-(2-trialkoxysilylethyl)-1,2-epoxycyclohexanes, bis(3-alkoxysilylpropyl) amines, tris(3-alkoxysilylpropyl)amines, 3-acryloyloxypropyl-trialkoxysilanes, including 3-acryloyloxymethyldialkoxysilane, 3-acryloyloxydimethylalkoxysilane, with methoxy, ethoxy, 2-methoxyethoxy, propoxy or acetoxy advantageously standing for one of the abovementioned alkoxy groups.

In the process of the invention, a preferable procedure involves introducing the generally liquid components of the prepolymer and heating them, adding a defined amount of water, catalyst if desired, wetting agent if desired, and the organosilicon components (ii) to (v), and subsequently introducing the oxide component (i) with thorough mixing. Preferably, the synthetic resin components, catalyst, wetting aids, water and the organosilicon components, and further auxiliaries if desired, are suitably first of all combined and mixed and only then is the oxide component (KA-O) added, a component mixture obtained by this preparation procedure being notable, inter alia and in particular, for good processing properties.

In the process of the invention it is preferred to employ from 0.1 to 60% by weight, more preferably from 15 to 50% by weight, with particular preference from 20 to 45% by weight, with very particular preference from 25 to 40% by weight, in particular from 30 to 35% by weight, of nanoscale oxide and/or mixed oxide (KA-O), based on the composition. These ranges include 1, 5, 10, 12, 22, 32, 42, 52 and 55% by weight.

In the process of the invention it is preferred to employ a nanoscale oxide and/or mixed oxide (KA-O) having an average particle diameter of from 1 to 100 nm, with particular preference from 5 to 50 nm, and with very particular preference from 10 to 40 nm. These ranges include 2, 5, 15, 20, 25, 30, 45, 50, 60, 70, 80 and 90 nm. The oxides and/or mixed oxides may possess a BET surface area of from 40 to 400 m²/g, preferably from 60 to 250 m²/g, with particular preference from 80 to 250 m²/g. These ranges include 50, 70, 90, 100, 150, 175, 200, 300 and 350 m²/g. As nanoscale oxides or mixed oxides it is possible for example—but not exclusively—to employ pyrogenic silica, which may have been modified by further fractions of metal or semimetal, such as aluminum, titanium, iron or zirconium.

It is further preferred to employ the oxide component (i) and at least one silane-based component, especially (ii), (iii), (iv) and/or (v), in a weight ratio of from 4:1 to 1:1, with particular preference from 3.5:1 to 1.5:1, with very particular preference from 3:1 to 2:1. These ranges include 3.25:1, 2.25:1, and 1.25:1.

The preferable liquid and/or curable synthetic resin or precursor of a liquid, curable synthetic resin, i.e., a prepolymer or a mixture of prepolymers, used in the process of the invention includes, for example, acrylates, methacrylates, epoxides, epoxy resins, polyurethanes, polyurethane resins, unsaturated polyesters, unsaturated polyester resins, epoxy acrylates, polyester acrylates, urethane acrylates, silicone acrylates, polyfunctional monomeric acrylates, such as trimethylolpropane triacrylate, trimethylolpropane trimethacrylate, ethoxylated trimethylolpropane triacrylate, propoxylated trimethylolpropane triacrylate, pentaerythritol triacrylate, ethoxylated pentaerythritol tetraacrylate, alkoxylated tetraacrylates, ditrimethylolpropane tetraacrylates, 3,4-epoxycyclohexyl-1-methyl 3,4-epoxycyclohexane-1'-carboxylate, 1,6-hexanediol diacrylate—to name but a few examples—or mixtures of two or more of the aforementioned synthetic resins and/or prepolymers, examples being mixtures of monofunctional and/or bifunctional and/or polyfunctional monomeric, optionally low-viscosity acrylates. Mixtures are possible.

The reaction of the invention takes place in general in the presence of a well-defined amount of water. For this purpose it is preferred to employ from 1 to 6 mol of water per mole of Si of the organosilicon components. This range includes 1.1, 1.5, 2, 2.5, 3, 3.5, 4, 4.5, 5 and 5.5 mol water.

The reaction of the invention is preferably conducted in the presence of a catalyst. A particularly suitable catalyst is an acid, preferably malefic anhydride, malefic acid, acidic acid, acidic anhydride, glycolic acid, citric acid, methanesulfonic acid or phosphoric acid. Mixtures are possible.

The use of a wetting agent may be helpful for the implementation of the reaction of the invention. Accordingly, the reaction is preferably conducted in the presence of sodium dodecyl sulfate.

In the process of the invention, the reaction is preferably conducted at a temperature in the range from 30 to 100° C., more preferably at a temperature in the range from 50 to 80° C. This range includes 40, 45, 55, 60, 70, 75 and 90° C.

Hydrolysis and condensation in the reaction of the invention generally produces an alcohol, which is preferably removed from the reaction system during the reaction and/or afterward. The removal of the alcohol formed during the reaction may be carried out by distillation, appropriately under reduced pressure. In general, the amount of alcohol in the product mixture, i.e., in the composition obtained by the reaction of the invention, is reduced to <2% by weight, preferably to from 0.01 to 1% by weight, with particular preference to from 0.1 to by weight, so as to give, advantageously, a solvent-free composition, i.e., a solvent-free coating material base or a solvent-free coating material.

Such compositions of the invention, directly or following the addition of further coating components, may be used to outstanding effect for the scratch-resistant coating of substrates.

The present invention accordingly also provides a composition based on a curable synthetic resin and including polymerizable organosilicon nanocapsules of the invention or prepared in accordance with the invention.

The present invention further provides a composition or a coating material based on a curable synthetic resin and obtainable as described herein.

Further components may appropriately be added to the composition of the invention or to the coating material of the invention, examples being initiators for the photochemical curing, Darocur® 1173, Lucirin® TPO-L, coatings stabilizers, such as HALS compounds, Tinuvins, and also antioxidants, such as Irganox®. Additives of this kind are generally employed in amounts of from 0.1 to 5% by weight, preferably from 2 to 3% by weight, based on the formulation or coating material. The introduction of further components into the coating system is suitably accompanied by thorough mixing. Advantageously, despite a large amount of polymerizable organosilicon nanocapsules, the formulations and coating materials of the invention are preferably notable for a comparatively low viscosity of from 500 to 1000 mPa s. This range includes 600, 700, 800 and 900 mPa s. The behavior of the systems is generally dilatant.

The liquid used in the process of the invention preferably includes one or more selected from the group including alcohol, methanol, ethanol, propanol, and/or the further components discussed above and below.

Accordingly, the invention also provides for the use of a composition of the invention as a coating material or as the basis for the preparation of a coating composition or coating material, especially for systems for scratch-resistant coating.

The application of the composition of the invention or of a coating material of the invention generally takes place by application to a substrate. For the coating of substrates it is possible to use the customary coating techniques, such as roller application, knifecoating, dipping, flow coating, pouring, spraying or brushing, for example.

By way of example, the formulation of the invention or the coating material may be applied uniformly to sheetlike substrates, such as paper, metal foils or polymer films, using a roll applicator, and then cured. The coating may suitably be cured at ambient temperature, i.e., coating temperature, by means of a W or electron beam process (EBC), which is environment-friendly since there is no solvent.

For electron beam curing, it is preferred to generate electrons having an energy of around 140 keV, the dose being from 30 to 60 kGy, preferably from 40 to 50 kGy. The residual $O_2$ content is preferably <200 ppm. Photochemical curing is suitably performed under inert gas: under nitrogen or argon, for example.

Alternatively, the coating may be cured by means of W irradiation, using monochromatic or polychromatic UV lamps with a wavelength of from 150 to 400 nm. In the case of W curing, as well, it is possible to operate at ambient temperature, between 10 and 60° C., for example. Here again, the $O_2$ content is suitably <200 ppm.

Accordingly, through the use of compositions and coating materials of the invention, it is possible in a particularly advantageous manner to produce coatings of outstanding scratch resistance. Moreover, coatings of the invention also possess good abrasion resistance. The determination of scratch hardness or scratch resistance is carried out here, in general, in accordance with DIN 53 799 using a hard metal ball. The abrasion can be effected, for example, in accordance with DIN 52 347 using coated faceplates.

The present invention accordingly likewise provides a process for producing a scratch-resistant coating, which includes applying a composition of the invention or a coating material of the invention to a ground or substrate and subjecting it to preferably photochemical curing. Alternatively, curing may be effected by chemical means, oxidatively, for example, using, for example, peroxide and an elevated temperature.

The present invention further provides scratch-resistant coatings obtainable by applying a composition of the invention or a coating material of the invention as described herein.

Coatings of the invention preferably have a thickness of from 1 to 100 μm, with particular preference from 2 to 40 μm, and with very particular preference from 5 to 15 μm. These ranges include 10, 20, 30, 50, 60, 70, 80 and 90 μm.

Accordingly it is possible in a particularly simple and economic way to furnish, for example, metals, such as aluminum, iron, steel, brass, copper, silver, magnesium, nonferrous metal alloys, wood, paper, board, textiles, stone products, plastics, thermoplastics, polycarbonate, glass, and ceramic, with a particularly scratch-resistant coating. The selection of the substantially solid substrate materials for coating is unrestricted. Such substrates may be furnished, for example, with a protective coating, known as top coating, as is employed, for example, as a clearcoat system in the automobile industry.

In particular it is possible by the present coating process to obtain, simply and economically, articles endowed with scratch resistance, such as decorative paper, aluminum foils, polycarbonate auto glazing, PVC window frames, doors, worktops, to name but a few.

Decorative paper of the invention, for example, is used for a simultaneously cost-effective, scratch-resistant and optically advantageous surface design of furniture.

Also provided by the present invention are articles having a coating of the invention, obtainable as described herein. In particular, the present invention provides a decorative paper obtainable as described herein.

An especially preferred embodiment of the present invention provides a polymerizable organosilicon nanocapsule, which includes:

a nanoscale core A, which includes:
  at least one oxide or mixed oxide, KA-O, of at least one metal or semimetal selected selected from the group including an element from main groups 2 to 6 of the Periodic Table, an element from transition groups 1 to 8 of the Periodic Table, a lanthanide, and mixtures thereof; and
an organosilicon shell B, which includes:
  at least one organosilicon compound having the formula (Ia):

$$(Si'O-)_xSi-R \quad (Ia)$$

wherein R is a vinyl or allyl group;
wherein x is a number from 0 to 20;
wherein Si and Si' are each tetravalent silicons;
wherein remaining free valences of Si are each independently SiO— or —Z;
wherein remaining free valences of Si' are each independently SiO—, —R, or —Z;
wherein the Z's are each independently hydroxyl or alkoxy radicals;
and wherein each Si and Si' in the shell B have not more than one R group attached thereto;
and wherein said organosilicon compound of the shell B is attached to said KA-O core A (KA-O) by one or more covalent linkages having the formula Ib $$(KA-O)-\{(Si'O-)_xSi-R\} \quad (Ib)$$

wherein R is a vinyl or allyl group;
wherein x is a number from 0 to 20;
wherein the remaining free valences of Si are each independently KA-O, SiO— or —Z;
wherein the remaining free valences of Si' are each independently KA-O, SiO—, —R, or —Z;
wherein the Z's are each independently hydroxyl or alkoxy radicals;
and wherein each Si and Si' in the shell B have not more than one R group attached directly thereto.

EXAMPLES

Having generally described this invention, a further understanding can be obtained by reference to certain specific examples which are provided herein for purposes of illustration only and are not intended to be limiting unless otherwise specified.

Starting Materials:

| Particle core A | | |
|---|---|---|
| Raw Material | Average particle size | BET surface area (DIN 66 131; in $m^2/g$) |
| Pyrogenic silica    AEROSIL ® 200 | 14 nm | 200 ± 20 |

| Shell B |  |
|---|---|
| Raw material |  |
| Vinyltrimethoxysilane | DYNASYLAN ® VTMO |
| Vinyltriethoxysilane | DYNASYLAN ® VTEO |
| 3-Methacryloyloxypropyltrimethoxysilane | DYNASYLAN ® MEMO |
| Organic substrate/synthetic-resin component | |
| Ethoxylated pentaerythritol tetraacrylate | Sartomer ® 494 |
| Auxiliaries | |
| Catalyst | Maleic anhydride |
| Wetting agent | Sodium dodecyl sulfate |
| Reactant | Water |

Example 1

18.0 parts by weight of AEROSIL 200/9.0 parts by weight of DYNASYLAN VTMO/73.0 parts by weight of Sartomer 494:

29.2 kg of Sartomer 494 (from Cray Valley) and 16 g of 4-hydroxyanisole are charged to a stirred vessel and heated to 65 to 70° C. To the heated acrylate there are added a solution of 0.15 kg of malefic anhydride and 0.072 kg of sodium dodecyl sulfate in 1.44 kg of water, and also over the course of 30 minutes 3.6 kg of DYNASYLAN VTMO. Subsequently, within the temperature range indicated above and with intensive stirring, 7.2 kg of AEROSIL 200 are metered in over the course of 1 to 2 hours. Stirring is continued for one hour at from 65 to 70° C. and methanol is removed from the system under reduced pressure. Finally, the batch is cooled to room temperature.

Example 2

18.0 parts by weight of AEROSIL 200/11.6 parts by weight of DYNASYLAN VTEO/70.4 parts by weight of Sartomer 494:

29.2 kg of Sartomer 494 (from Cray Valley) and 48 g of 4-hydroxyanisole are charged to a stirred vessel and heated to 65 to 70° C. To the heated acrylate there are added a solution of 0.15 kg of malefic anhydride and 0.075 kg of sodium dodecyl sulfate in 1.5 kg of water, and also over the course of 30 minutes 4.81 kg of DYNASYLAN VTEO. Subsequently, within the temperature range indicated above and with intensive stirring, 7.466 kg of AEROSIL 200 are metered in over the course of 1 hour. Stirring is continued for 3 hours at from 65 to 70° C. and ethanol is removed from the system under reduced pressure. Finally, the batch is cooled to room temperature.

Example 3

18.0 parts by weight of AEROSIL 200/9.0 parts by weight of DYNASYLAN MEMO/73.0 parts by weight of Sartomer 494:

29.2 kg of Sartomer 494 (from Cray Valley) and 16 g of 4-hydroxyanisole are charged to a stirred vessel and heated to 65 to 70° C. To the heated acrylate there are added a solution of 0.15 kg of malefic anhydride and 0.0262 kg of sodium dodecyl sulfate in 0.5246 kg of water, and also over the course of 30 minutes 3.6 kg of DYNASYLAN MEMO. Subsequently, within the temperature range indicated above and with intensive stirring, 7.2 kg of AEROSIL 200 are metered in over the course of 1 to 2 hours. Stirring is continued for 60 minutes at from 65 to 70° C. and methanol is removed from the system under reduced pressure. Finally, the batch is cooled to room temperature.

Use Examples

The coating materials of examples 1 to 3 are applied by hand to square PVC plates (edge length 10 cm, thickness 2 mm) using a coating bar with a gap height of 50 μm and are cured in a low-energy electron accelerator (140 keV) with a dose of 50 kGy. The residual oxygen content in the accelerator was <200 ppm. The same procedure is carried out using Sartomer 494 (comparative example). The specimens are tested for their scratch hardness in accordance with DIN 53 799 using a hard metal ball (diameter 1 mm). The specimens are also tested for abrasion resistance in accordance with DIN 52 347 and ASTM D-1044. The abrasion resistance was determined by measuring the light scattering (haze) after 100 and, respectively, 500 Taber revolutions (2 CS-10 abrasive wheels, covered with 5-42 emery paper, F=5.5±0.2 M, 3 individual measurements, arithmetic mean). The results of the tests are collated in Table 1.

TABLE 1

| Examples | Formulation | Ratio of resin: $SiO_2$:silane {parts by weight} | Properties of the coating (evaluation) A: Scratch hardness {N} B: Haze {%} |
|---|---|---|---|
| (DS VTMO) Example 1 | 29.2 kg Sartomer 494 7.2 kg Aerosil 200 3.6 kg DS VTMO Maleic anhydride | 73.0:18.0:9.0 | A: 9.0 N (very good) B: 2.9/6.4 (good) |
| (DS VTEO) Example 2 | 29.2 kg Sartomer 494 7.466 kg Aerosil 200 4.82 kg DS VTEO Maleic anhydride | 70.4:18.0:11.6 | A: 8.5 N (good) B: 3.5/7.9 (still good) |
| (DS MEMO) Example 3 | 29.2 kg Sartomer 494 7.2 kg Aerosil 200 3.6 kg DS MEMO Maleic anhydride | 73.0:18.0:9.0 | A: 8.5 N (good) B: 4.1/8.6 (worse than Ex. 1 and 2) |
| (Sartomer 494 on PVC) Comparative Example | 100% Sartomer 494 | 100 | A: 6.0 N (poor) B: 20.3/61.4 (very poor) |
| PVC substrate | — | — | A: 4.0 N (very poor) B: 101.2/127.5 (very poor) |

Obviously, numerous modifications and variations of the present invention are possible in light of the above teachings. It is therefore to be understood that within the scope of the appended claims, the invention may be practiced otherwise than as specifically described herein.

This application is based on German patent applications 10049632.6, filed Oct. 5, 2000, and 10100633.0, filed Jan. 9, 2001, the entire contents of each of which are hereby incorporated by reference, the same as if set forth at length.

The invention claimed is:

1. A composition comprising a curable synthetic resin and a polymerizable organosilicon nanocapsule, wherein the composition is prepared by a process which comprises:

heating a precursor of the curable synthetic resin comprising a monomeric tetraacrylate, adding water and a catalyst, and optionally, a wetting agent, adding at least one organosilicon component selected from the group consisting of 3-methacryloyloxypropyltrimethoxysilane, 3-methacryloyloxypropyltriethoxysilane, 3-methacryloyloxypropylmethyldimethoxysilane, 3-methacryloyloxypropylmethyldiethoxysilane, 3-methacryloyloxy-2-methylpropyltrimethoxysilane, 3-methacryloyloxy-2-methylpropyltriethoxysilane, vinylalkoxysilanes and alkyltrialkoxysilanes, and optionally, a monomeric and/or oligomeric silicic ester which carries at least one selected from the group consisting of methoxy, ethoxy, n-propoxy, i-propoxy group and combinations thereof and has an average degree of oligomerization of from 1 to 50, and optionally, an organofunctional siloxane whose functionalities are identical or different and in which each silicon atom in the siloxane carries at least one functionality selected from the group consisting of alkyl, fluoroalkyl, cyanoalkyl, isocyanoalkyl, alkenyl, aminoalkyl, diaminoalkyl, triaminoalkyl, alkoxyalkyl, hydroxyalkyl, acylalkyl, glycidyloxyalkyl, acryloyloxyalkyl, methacryloyloxyalkyl, mercaptoalkyl, ureidoalkyl, aryl, alkoxy, methoxy, ethoxy, and combinations thereof, and remaining free valences of the silicon atoms in the siloxane are satisfied by methoxy or ethoxy or hydroxyl groups, mixing and then adding at least one oxide and/or mixed oxide (KA-0) particle of at least one metal or semimetal selected from the group consisting of main groups 2 to 6, of the Periodic Table of the Elements, transition groups 1 to 8 of the Periodic Table of the Elements, lanthanides, and mixtures thereof with thorough mixing, and removing alcohol formed by hydrolysis and/or condensation; and wherein the mole ratio of water to the at least one organosilicon component ranges from 0.5 to 3.

2. The composition according to claim 1, wherein the at least one organosilicon component is selected from the group consisting of a vinylalkoxysilane and an alkyltrialkoxysilane, and combinations thereof.

3. The composition according to claim 1, wherein the at least one organosilicon component is a vinylalkoxysilane.

4. The composition according to claim 1, wherein the at least one organosilicon component is an alkyltrialkoxysilane.

5. The composition according to claim 1, wherein the monomeric tetraacrylate comprises ethoxylated pentaerythritol tetraacrylate.

6. The composition according to claim 1, wherein at least said monomeric and/or oligomeric silicic ester is present.

7. The composition according to claim 1, wherein at least said organofunctional siloxane is present.

* * * * *